3,296,131
ANTIFOAMER FOR HYDROCARBON OILS
Albert T. Knecht, Jr., Hazel Crest, Ill., assignor to Sinclair Research, Inc., New York, N.Y., a corporation of Delaware
No Drawing. Filed Oct. 22, 1965, Ser. No. 502,536
10 Claims. (Cl. 252—35)

This invention relates to hydrocarbon oils having reduced foaming tendencies and, more particularly, to the use of metal salts of styrene-maleic anhydride copolymers as foam inhibitors for industrial oils and functional automotive lubricating oils.

The problem of foam suppression of hydrocarbon oils has in recent years become of major importance owing to the use of foam-inducing additives in the oils and to new developments in engine construction. Foaming leads to various disadvantages, among them being loss of oil due to foam seepage and increased engine wear due to incomplete coating of bearing surfaces. Oils tend to foam or froth due to agitation in the presence of gases or vapors, such as air, oil vapor, products of combustion and the like.

Mechanical devices have been proposed for destroying or breaking foam as it is formed. Usually such devices have been cumbersome or inefficient, or both, and they are not generally used commercially. The development of chemical foam inhibitors such as the silicone anti-foam agents has minimized the problem to some extent. However, the cost of these additives has prohibited their use in the less expensive hydrocarbon oil products.

There exists then a need for an inexpensive yet effective foam inhibitor for use in the less expensive hydrocarbon oil products such as industrial oils and functional automotive lube oils. It has now been found that the addition to hydrocarbon oils of a minor amount, e.g., about 50 to 7000 p.p.m., of a metal salt of a styrene-maleic anhydride copolymer, the metal being selected from Groups IB, IIB, IV and VIII of the Periodic Table, inhibits the foaming activity of the oils. The styrene-maleic anhydride copolymer, of which the metal salt is employed in the present invention, is a resinous copolymer of styrene and maleic anhydride having about 0.5 to 3 moles of styrene per mole of maleic anhydride, preferably about 1:1. The molecular weights of the copolymers are often at least about 600 up to about 3000 but can be of higher molecular weight, e.g., up to about 50,000 or more. The melting points of the lower molecular weight copolymers will generally range from about 80 to 200° C. as determined by the Fisher-Johns Melting Point Apparatus.

Preparation of the copolymer of the invention can be by any method desired. A preferred method is by solution polymerization where the monomers are polymerized in a suitable solvent employing as a polymerization catalyst a free-radical catalyst, such as a peroxide, preferably benzoyl peroxide or dicumyl peroxide, at a temperature of about 75 to 300° C. or more. Suitable solvents include the aromatic hydrocarbon solvents, such as cumene, p-cymene, xylene, toluene, etc. Other suitable solvents are the ketones, such as methylethylketone. The preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization, the formation of the copolymers causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation.

The metal salts of the present invention represent at least about 60% conversion, preferably from about 70–90%, of the carboxyl groups of the copolymer to their salt forms. They can be prepared by first forming the alkali metal or ammonium salt of the copolymer by simple hydrolysis of the copolymer with water in the presence of an alkali metal hydroxide or ammonium hydroxide. The hydrolysis can be conveniently carried out by making a slurry in distilled water of at least 2 moles of alkali metal hydroxide per mole of the repeating copolymer unit and heating over a water bath until the hydrolysis is complete. Any of the alkali metal hydroxides, such as the hydroxide of sodium, potassium and lithium or ammonium hydroxide can be employed, but sodium hydroxide is preferred.

An aqueous solution of the alkali metal salt of the copolymer thus formed can be added, preferably in at least stoichiometric amounts, to an inorganic or organic salt of a metal selected from the Group IB, IIB, IV, and VIII metals of the Periodic Table (Handbook of Chemistry and Physics, 35th edition, pp. 392–393) as, for example, zinc, tin ($Sn^{++}$ or $Sn^{++++}$) copper, silver, mercury, lead, zirconium, etc., which salt is soluble in the solution of the alkali metal salt of the copolymer. The preferred selected metal salts are readily water-soluble as, for instance, the water-soluble metal chlorides and acetates. It is preferred that the metal salt be in aqueous solution on addition of the solution of alkali metal salt of the copolymer. Addition with continuous stirring provides the metal salts of the invention which are insoluble in the reaction medium and precipitate out of solution.

The following examples are included to illustrate preparation of the foam inhibitors of the present invention:

Example I

A water-soluble sodium salt of the copolymer of styrene and maleic anhydride was prepared as follows:

In a two-liter resin kettle was slurried 1 mole of a water-soluble copolymer of styrene and maleic anhydride having 1 mole of styrene per mole of maleic anhydride and a molecular weight of approximately 1350, the two moles of sodium hydroxide (15% solution in water). The slurry was heated on a water bath at 70–80° C. to hydrolyze the copolymer. The hydrolysis was complete in about 1½ to 2 hours.

264 grams (1 mole) of the sodium salt of the copolymer prepared as above was diluted to 400 ml. with distilled water. 136.2 grams (1 mole) of zinc chloride was dissolved in distilled water and the resulting solution then added to the solution of the sodium salt of the copolymer with continuous agitation. An insoluble zinc salt of the copolymer immediately precipitated out of solution. The mixture was then heated on a 70° C. water bath for 15–20 minutes and filtered. The insoluble zinc salt of the copolymer was then washed and filtered. The zinc salt analyzed as follows:

| | |
|---|---|
| Percent Zn | 14.9 |
| Percent C | 35.0 |
| Percent H | 5.6 |
| Percent O | 24.6 |
| Melting Point, ° C. | +300 |
| Color | White |

Example II

The tin salt of the copolymer employed in Example I was prepared employing a procedure similar to that of Example I. The amount of the reactants employed were as follows:

|  | 1 Mole (g.) | Amount Used (g.) |
|---|---|---|
| SnCl | 260.5 | 52.1 |
| Copolymer (Na Salt) | 264.0 | 52.8 |

The tin salt analyzed as follows:

| | |
|---|---|
| Percent $Sn^{++++}$ | 12 |
| Percent C | 43 |
| Percent H | 4.7 |
| Percent O | — |
| Melting Point, °C. | +300 |
| Color | White |

Example III

The mercuric salt of the copolymer employed in Example I was prepared employing a procedure similar to that of Example I with the exception that, since mercuric chloride is only partially soluble in water, solution of the chloride was completed in the alkaline medium of the disodium salt. The amounts of reactants employed were as follows:

| Mercuric Salt | 1 Mole (g.) | Amount Used (g.) |
|---|---|---|
| $HgCl_2$ | 271.5 | 54.3 |
| Copolymer (Na Salt) | 264.0 | 52.9 |

The mercuric salt analyzed as follows:

| | |
|---|---|
| Percent Hg | 33 |
| Percent C | 15 |
| Percent H | 2.3 |
| Percent O | — |
| Melting Point, °C. | +300 |
| Color | Tan |

Example IV 175 grams of the copolymer employed in Example I was placed in a two-liter Pyrex flask (resin type) and then 1000 milliliters of distilled water was added. The slurry was heated to 70° C. for about one hour. At this point sodium hydroxide was slowly added as a 15% solution of sodium hydroxide in water until a clear solution was formed. The salt mixture was heated and agitated for one hour and 128 grams of stannous chloride was slowly added in a water solution. The concentration of the chloride in water was 11.5%. The mixture was then agitated about 2 hours, filtered, washed with water and air dried. The colorless salt after air-drying showed a wash yield of the tin salt of better than 90%. The stannous salt analyzed as follows:

| | |
|---|---|
| Percent $Sn^{++}$ | 38 |
| Percent C | 28 |
| Percent H | 2.8 |
| Percent O | — |
| Melting Point, °C. | +300 |
| Color | White |

Example V

The copper salt of the copolymer employed in Example I was prepared employing the general procedure of Example IV using an aqueous solution containing 140 grams of copper acetate. The concentration of copper acetate in the solution was 8% by weight. The mixture of reactants was agitated one hour at 85° C., cooled, filtered, washed with 20 liters of hot water and air dried. Approximately 100% by weight yield of the copper salt was obtained. The copper salt analyzed as follows:

| | |
|---|---|
| Percent Cu | 19 |
| Percent C | 37 |
| Percent H | 4.2 |
| Percent O | — |
| Melting Point, °C. | +300 |
| Color | Green |

Example VI 17.0 grams of the sodium salt of the copolymer prepared as described in Example I was dissolved in 500 milliliters of water. 12 grams of silver nitrate were slowly added at room temperature and the mixture heated to 70° C. for two hours in the dark. The mixture was then filtered and washed in the dark. Upon air drying, a high yield of a white salt was recovered. The salt was light-sensitive, darkening and eventually turning black in the presence of light. The silver salt analyzed as follows:

| | |
|---|---|
| Percent Ag | 10 |
| Percent C | 54 |
| Percent H | 5.1 |
| Percent O | — |
| Melting Point, °C. | +300 |
| Color | White |

Example VII 20.2 grams of a copolymer of styrene and maleic anhydride having 1 mole of styrene per mol of maleic anhydride and a molecular weight of about 1600 was added to a solution of 48 milliliters of 28% ammonium hydroxide in 150 milliliters of water. The addition was carried out at 50° C. and required about 30 minutes to effect complete solution. 33.1 grams of lead nitrate was dissolved in 75 milliliters of water. Both the lead nitrate solution and copolymer salt solution were heated to 83–85° C. The lead nitrate solution was added slowly over a 30-minute period to the copolymer salt solution. A precipitate formed which could be redispersed by addition of a few drops of acetic acid. After about 20% of the lead nitrate solution had been added a gummy precipitate formed which could not be redispersed with additional acetic acid. Addition of the remainder of the lead nitrate caused the gradual formation of a white precipitate. The precipitate was filtered and washed repeatedly until the filtrate no longer gave a positive for lead ion. The copolymer salt was vacuum dried for 18 hours at 75° C. A yield of 30.3 grams was obtained. Since the theoretical weight for lead per anhydride unit is 42.5 grams, the conversion to the lead salt was 71%. The lead salt analyzed as follows:

| | |
|---|---|
| Percent Pb | 28.7 |
| Percent C | 40.66 |
| Percent H | 4.47 |
| Percent O | — |
| Melting Point, °C. | +300 |
| Color | Gray |

Example VIII

The zirconium salt of the styrene-maleic anhydride copolymer employed in Example I was prepared employing a procedure similar to that of Example I.

The amounts of the reactants employed were as follows:

|  | 1 Mole (g.) | Amount Used (g.) |
|---|---|---|
| ZrCl₄ | 233.05 | 46.6 |
| Copolymer (Na Salt) | 264.0 | 52.8 |

The zirconium salt analyzed as follows:

Percent Zr _____ 15.4
Melting Point, °C. _____ +300

The salts of the present invention exhibit foam suppressing activities toward normally liquid hydrocarbon oils. For example, hydrocarbon oils which are rendered substantially non-foaming by incorporation therein of minor amounts of the present salts include crude oil, wherein foaming in pipe lines, storage tanks and the like is suppressed; gear lubricants, advantageously for transmission gears of automotive equipment; light oils used in steam turbines, wherein agitation may otherwise produce considerable foaming; as well as in the aforementioned lubricants for internal combustion engines, such as automotive, aviation, diesel and like engines. Normally liquid hydrocarbon oils, either synthetic or natural, of any type, e.g., paraffinic, naphthenic, aromatic or blended, exhibit reduced foaming tendencies by the addition thereto of the inhibitors of the present invention. The foam inhibiting effects of these salts extend to such diversified hydrocarbon oils as diesel fuels, hydraulic oils, spindle oils, journal bearing oils, gasoline, kerosene, distillate fuel oils, pneumatic tool lubricants, liquid greases, etc.

The salts of the present invention can be tested for foam-inhibiting properties at concentrations ranging from 100 to 15,000 p.p.m. in soluble oil emulsions and in base oils. The time required for foam to break after vigorous shaking is compared with an uninhibited control emulsion or oil. All of the salts possess anti-foam activity; the zinc and zirconium salt are particularly effective. Those salts, the preparation of which are detailed in the foregoing examples, exhibited particularly good anti-foaming activities at concentrations of about 1000 p.p.m. Typical test runs on the zinc and zirconium salts, of the foregoing examples, yielded the results below. In each run with the zirconium salt a blend of base oil and the salt were diluted with distilled water in a weight ratio of oil plus salt to water of 1:20 and the foaming properties of the emulsion checked, while with the zinc salt the oil and water emulsion was prepared first, at a 1:20 ratio, and the salt added thereto in the amounts indicated. The results observed were substantially the same for both salts, as follows:

| Concentration in base oil (p.p.m.): | Foam inhibition [1] |
|---|---|
| 15,000 | + |
| 5,000 | + |
| 1,000 | + |
| 500 | +/− |
| 100 | +/− |
| Control | − |

[1] Foam inhibition based on comparison with uninhibited control.
(+) Indicates foam was not stable and broke readily.
(+/−) Indicates slight difference from control.
(−) Indicates no foam inhibition.

It is claimed:

1. A composition consisting essentially of a normally liquid hydrocarbon oil having foaming tendencies and a foam suppressing amount of a metal salt of a copolymer of styrene and maleic anhydride, said metal being selected from the group consisting of Groups IB, IIB, IV and VIII of the Periodic Table and said copolymer having a molecular weight of about 600 to 50,000 and a molar ratio of styrene to maleic anhydride of about 0.5 to 3:1.

2. The composition of claim 1 wherein said metal salt is present in the composition in amounts from about 50 to about 7000 p.p.m.

3. The composition of claim 2 wherein the copolymer has a molecular weight of about 600 to 3000.

4. The composition of claim 3 wherein the metal is zirconium.

5. The composition of claim 3 wherein the metal is tin.

6. The composition of claim 3 wherein the metal is zinc.

7. The composition of claim 3 wherein the metal is copper.

8. The composition of claim 3 wherein the metal is silver.

9. The composition of claim 3 wherein the metal is mercury.

10. The composition of claim 3 wherein the metal is lead.

References Cited by the Examiner

UNITED STATES PATENTS

| 2,345,061 | 3/1944 | Miles | 252—321 |
| 2,616,849 | 11/1952 | Giammaria | 252—39 |
| 2,698,264 | 12/1954 | Niles | 260—78.5 |
| 2,698,298 | 12/1954 | Giammaria | 252—39 |

DANIEL E. WYMAN, *Primary Examiner.*

C. F. DEES, *Assistant Examiner.*